United States Patent [19]

Won et al.

[11] Patent Number: 5,577,039
[45] Date of Patent: Nov. 19, 1996

[54] SYSTEM AND METHOD OF SIGNAL TRANSMISSION WITHIN A PLESIOCHRONOUS DIGITAL HIERARCHY UNIT USING ATM ADAPTATION LAYERS

[75] Inventors: Chan Y. Won; Young I. Kim; Gyu S. Lee; Myung G. Park, all of Gaithersburg, Md.

[73] Assignee: Samsung Electronics, Inc., Ridgefield Park, N.J.

[21] Appl. No.: 482,393

[22] Filed: Jun. 7, 1995

[51] Int. Cl.$^6$ .................................................. H04L 12/66
[52] U.S. Cl. .................................... 370/60.1; 370/112
[58] Field of Search ........................... 370/60, 60.1, 94.1, 370/94.2, 112, 110.1, 85.11, 85.1, 102, 84, 79, 91, 118, 100.1, 103, 109; 375/225, 354, 355, 240, 222

[56] References Cited

U.S. PATENT DOCUMENTS 5,408,469  4/1995  Opher et al. ............................ 370/60
5,414,702  5/1995  Kudoh ..................................... 370/60

Primary Examiner—Douglas W. Olms
Assistant Examiner—Dang Ton
Attorney, Agent, or Firm—Lagerman & Jones

[57] ABSTRACT

A system for cross conversion of plesiochronous digital hierarchy (PDH) and asynchronous transfer mode (ATM) data is disclosed. A PDH DS3 signal is received and demultiplexed into 28 DS1 data. ATM adaptation layer modules convert the 28 DS1 data to ATM cell streams. The ATM cell streams are multiplexed into a single ATM MUX cell stream and then multiplexed with another cell stream. A router receives the combined multiplexed cell stream, adds a header field, and outputs an ATM cell. The system functions to also convert the ATM cell data to DS3 PDH data using the same basic components.

12 Claims, 3 Drawing Sheets

SYSTEM AND METHOD OF SIGNAL TRANSMISSION WITHIN A PLESIOCHRONOUS DIGITAL HIERARCHY UNIT USING ATM ADAPTATION LAYERS

BACKGROUND OF THE INVENTION

1. Field of the Invention

The present invention generally relates to a signal conversion, and, more particularly, to a system and method of channelized signal transmission within a plesiochronous digital hierarchy (PDH) unit using ATM adaptation layers (AALs).

2. Description of the Prior Art

A plesiochronous digital hierarchy (PDH) is defined by a set of bit rates and multiplexing schemes for multiplexing of several, not necessarily synchronous, 64 kbit/s ISDN (Integrated Services Digital Network) channels into higher bit rate signals.

PDH units generally provide many types of services. One is to provide a PBX (private branch exchange) interface service, using channel associate signaling (CAS) or channelized T1 signaling. A second function is to provide a multiplexer (T1/E1/T3) interface service. Moreover, PDH units provide digital cross connection and channelized T3 services.

The data transmission format for PDH is different from the asynchronous transfer mode (ATM) data transmission format. As the use of ATM data transmission increases, the need to convert from PDH to ATM and from ATM to PDH will increase. Existing conversion solutions, however, utilize high cost, complex hardware schemes to convert and transfer the requisite data.

In light of the foregoing, there exists a need for a simplified system and process that provides for conversion from PDH to ATM data and from ATM to PDH data.

SUMMARY OF THE INVENTION

The present invention is directed to system and method of converting PDH to ATM data and ATM to PDH data, which substantially obviates one or more of the problems due to the limitations and disadvantages of the related art.

In general, the present invention provides a cross connection between two different topologies, PDH and ATM, specifically an interface between DS3 (digital signal level 3) PDH and 672 DS0 ATM channelized data, by using an ATM adaptation layer AAL1.

The AAL1 layer performs a segmentation and reassembly (SAR) function. At the transmitting side, the AAL1 segments the higher layer protocol data units (PDUs) into suitably sized ATM cells consisting of a 48 byte information field and a 5 byte cell header. The header defines and recognizes individual communications. At the receiving side, the AAL1 layer reassembles or reconfigures the ATM cells into higher layer PDUs.

To achieve these and other advantages and in accordance with the purpose of the invention, as embodied and broadly described, the invention provides for a system for cross conversion of plesiochronous digital hierarchy (PDH) and asynchronous transfer mode (ATM) data, comprising: in a PDH to ATM conversion, a link interface unit for receiving a first digital signal from a network link; a multiplexer/demultiplexer coupled to receive the first digital signal and converting the first digital signal into multiple second digital signals; a plurality of ATM adaptation layer modules for receiving respective sets of the second digital signals and generating a respective plurality of ATM adaptation layer module cell streams; a first stage cell multiplexer/demultiplexer for converting the plurality of adaptation layer module cell streams to a first multiplexed cell stream; a second stage cell multiplexer/demultiplexer for combining the first multiplexed cell stream with a second cell stream; and a router coupled to receive the combined cell stream and converting the combined cell stream to an ATM cell for transmission to a bus.

In another aspect, the invention provides for a system of convening ATM data to PDH data, wherein the router receives an ATM cell from the bus and converts the ATM cell to the combined cell stream; the second stage cell multiplexer/demultiplexer segments the combined cell stream into a first multiplexed cell stream and a second cell stream; the first stage multiplexer/demultiplexer segments the first multiplexed cell into a plurality of adaptation layer module cell streams; the ATM adaptation layer modules converting the adaptation module cell streams into the respective sets of the second digital signals; the multiplexer/demultiplexer combining the second digital signals into a first digital signal; and the link interface unit receiving and transferring the first digital signal to the network link.

It is to be understood that both the foregoing general description and the following detailed description are exemplary and explanatory and are intended to provide further explanation of the invention as claimed.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
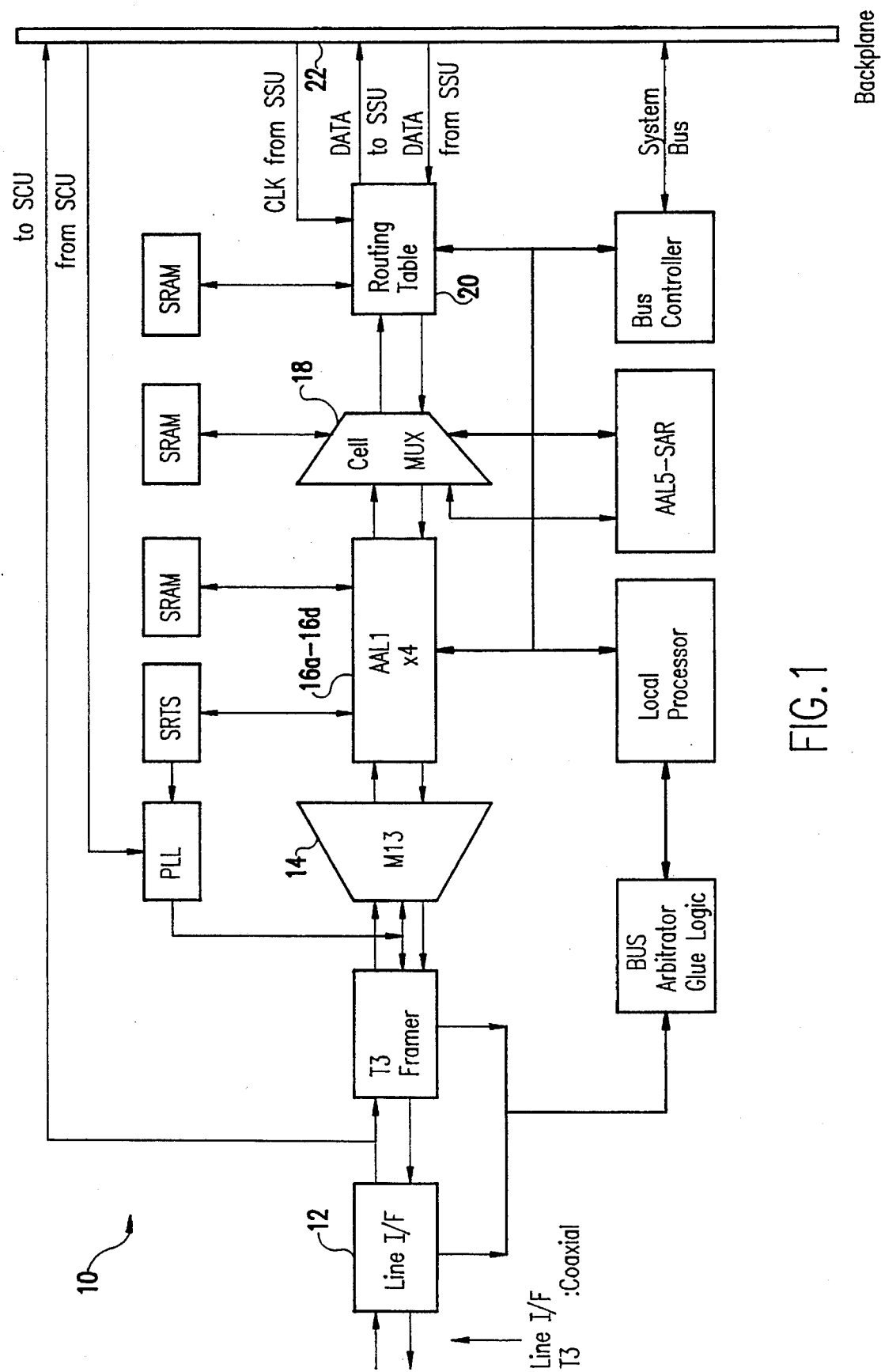
FIG. 1 is a diagrammatical representation of a PDH/ATM cross-connection system according to the present invention.

Referring now to the drawings, and more particularly to FIG. 1, there is shown a general overview of a system structure 10 employing the PDH/ATM interface apparatus and method of communication of the present invention.

Briefly, with reference to FIG. 1, PDH DS3 data first enters a link interface unit 12. The DS3 data is then demultiplexed into 28 DS1 data in multiplexer/demultiplexer (MUX/DEMUX) 14. The 28 DS1 data is divided up and fed to four AAL1 layers 16a–16d, where it is segmented into four ATM cells prior to entering a cell multiplexer 18. The cells are then sent to a router/rerouter 20 for transfer to the backplane bus 22 for eventual transfer to a system switch unit (SSU). As shown in FIG. 1, the data flow may be reversed as well, with ATM data from the SSU being converted to a PDH DS3 data for transfer to a network link.

Figure 2:
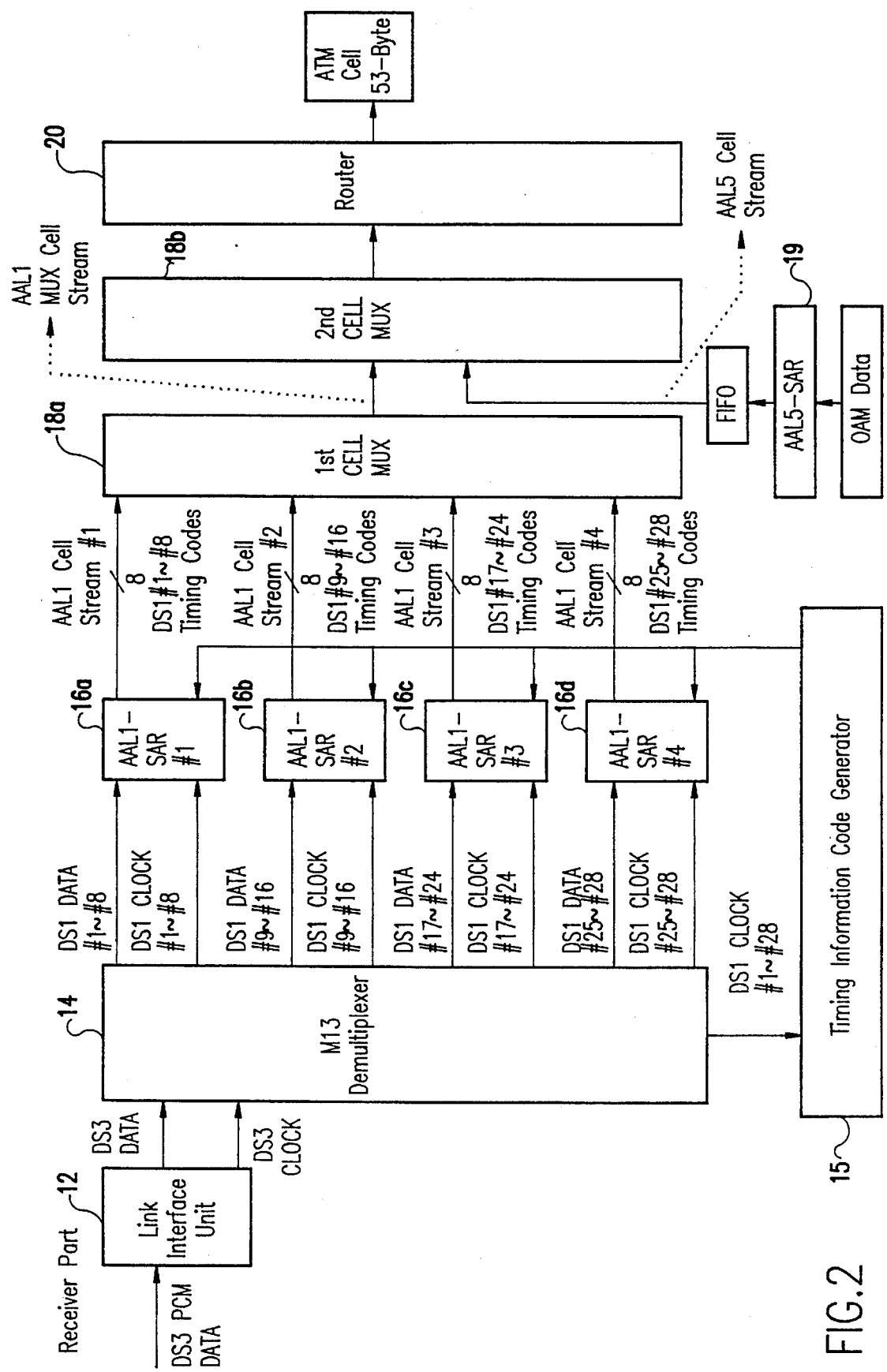
FIG. 2 is more detailed diagrammatical representation of the receive side of the system components of FIG. 1.

The above components of the conversion process will now be described in greater detail with reference to FIG. 2. FIG. 2 is a system block diagram of the receiver part of the PDH/ATM system components which convert the PDH DS3 data to ATM0 cell data.

DS3 PCM data incoming from the PDH link first connects to the link interface unit 12 where analog data is converted to digital data. The DS3 digital data is then fed to DEMUX 14 where the DS3 data is demultiplexed into 28 DS1 digital data before being sent to four AAL1-SAR (ATM adaptation layer-Segmentation and Reassembly) chips 16a–16d.

Since each AAL1-SAR chip is capable of converting 8 DS1 PCM data streams into 1 ATM cell stream, four AAL1-SAR chips are used. As depicted, therefore, DS1 data #1–8 are routed to AAL1-SAR #1, DS1 data #9–16 are routed to AAL1-SAR #2, DS1 data #17–24 are routed to AAL1-SAR #3, and DS1 data #25–28 are routed to AAL1-SAR #4, respectively.

The conversion from DS1 to ATM cell data is generally performed in accordance with such standards as ITU-T Recommendations 1.363, ANSI TIM1.3/91-003, and ANSI T1.630-1993.

The four AAL1-SAR cell streams are then sent to a first-stage (18a) of cell MUX chip 18, which is a cell buffer, where the four AAL1-SAR cells are multiplexed to single cell stream AAL1 MUX.

In the meantime, system operation and management data (OAM data) is converted to an AAL5 cell stream at the AAL5-SAR chip 19. Those cell streams are then sent to a second-stage (18b) of cell MUX chip 18. Here, the AAL5 cell streams are multiplexed with the AAL1 MUX cell stream from the first stage 18a MUX chip, then outputted to the router 20 as the final ATM cell streams. The router 20 adds a 5 byte path tag information header for output as an ATM cell to the bus.

Figure 3:
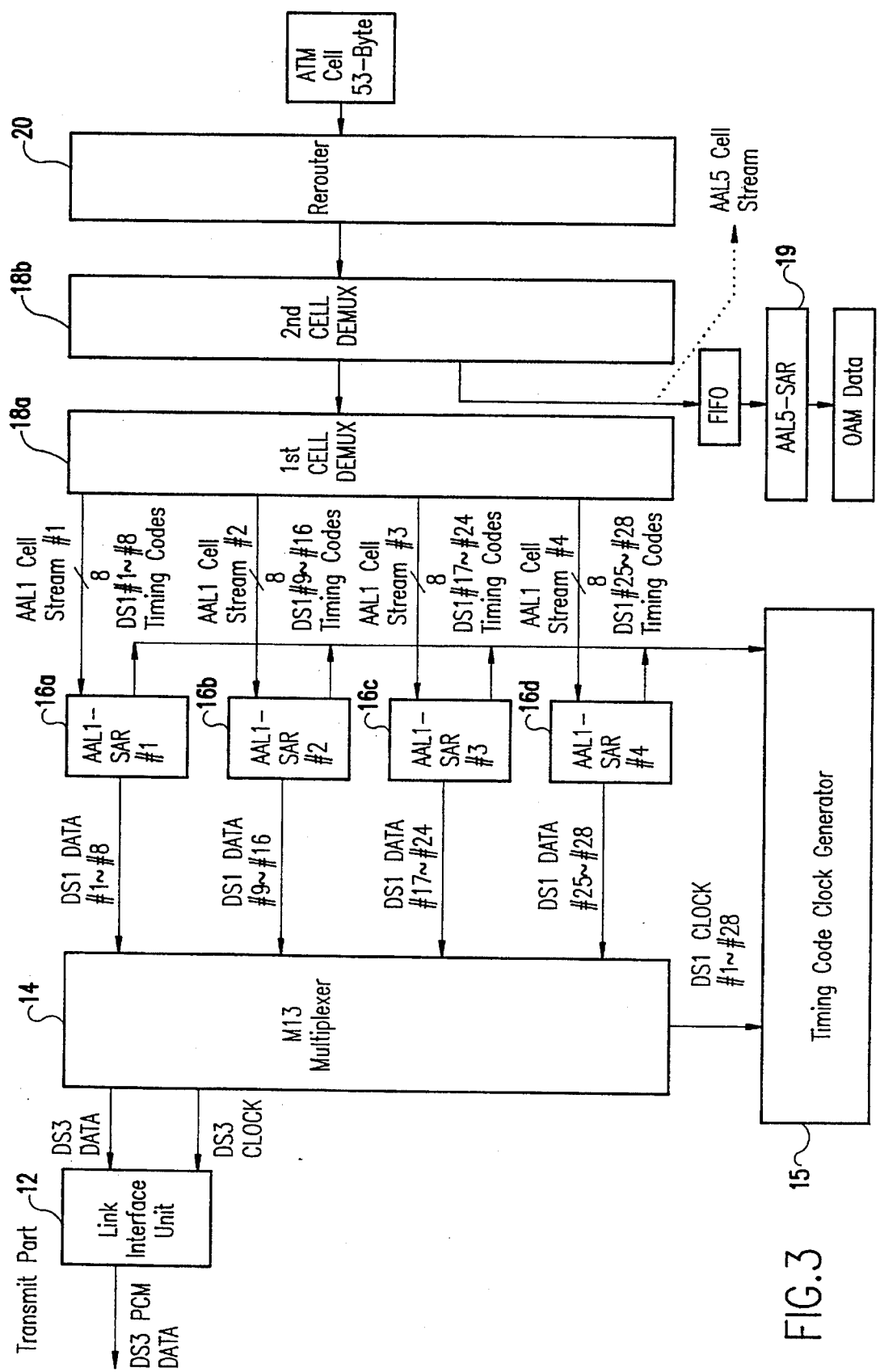
FIG. 3 is more detailed diagrammatical representation of the transmit side of the system components of FIG. 1.

FIG. 3 is a system block diagram of the transmitting part of the PDH/ATM system which converts ATM0 cell data to PDH DS3 data. Basically, the transmitting process uses the same system components, but functioning in a reverse manner.

With reference to FIG. 3, the conversion process begins when the incoming 53 byte ATM cell stream from the backplane 22 enters the rerouter 20 where the path tag header is dropped.

The cell stream is then demultiplexed into an AAL5 cell stream and an AAL1 MUX cell stream in the second stage 18b of MUX/DEMUX 18. The AAL1 MUX stream is then sent to the first stage 18a of MUX/DEMUX 18 for conversion to four AAL1 cell streams. The four cell streams are sent to four respective AAL1-SAR chips 16a–16d where each AAL1 SAR chip converts the AAL1 cell stream into eight DS1 bit streams by synchronizing to the received timing clock 15. The resulting 28 DS1 bit streams are then sent to the MUX 14 where they are multiplexed into a DS3 data stream. The DS3 data is then routed to the link interface unit 12.

The present invention thus provides for the conversion of ATM data to PDH data, and PDH data to ATM data. Also, cross-connectability of 28 DS1 signals to 1 DS3 signal is achieved using DS1 channelized technology and MUX/DEMUX technology of DS3. Operation and management (OAM) data may be transmitted using the ATM path through the backplane.

Due to the simplified design, the conversion process of the present invention may easily be integrated using conventional integrated gate-array VLSI technology.

While the invention has been described in terms of the embodiments described above, those skilled in the art will recognize that the invention can be practiced with modification within the spirit and scope of the appended claims.

Having thus described my invention, what we claim as new and desire to secure by Letters Patent is as follows:

1. A system for cross conversion of plesiochronous digital hierarchy (PDH) and asynchronous transfer mode (ATM) data, comprising:

in a PDH to ATM conversion, a link interface unit for receiving a first digital signal from a network link;

a multiplexer/demultiplexer coupled to receive said first digital signal and converting said first digital signal into multiple second digital signals;

a plurality of ATM adaptation layer modules for receiving respective sets of said second digital signals and generating a respective plurality of ATM adaptation layer module cell streams;

a first stage cell multiplexer/demultiplexer for converting said plurality of adaptation layer module cell streams to a first multiplexed cell stream;

a second stage cell multiplexer/demultiplexer for combining said first multiplexed cell stream with a second cell stream; and a router coupled to receive said combined cell stream and converting said combined cell stream to an ATM cell for transmission to a bus.

2. A system as in claim 1, wherein the first digital signal comprises DS3 PDH data.

3. A system as in claim 1, wherein the second digital signals comprise 28 DS1 data.

4. A system as in claim 1, wherein the respective sets of second digital signals comprise a maximum of eight DS1 data signals.

5. A system as in claim 1, wherein the second cell stream consists of operation and management data.

6. A method of converting plesiochronous digital hierarchy (PDH) to asynchronous transfer mode (ATM) data, the method comprising the step of:

receiving a first digital signal from a network link;

converting said first digital signal into multiple second digital signals;

converting said multiple second digital signals into a plurality of adaptation layer module cell streams;

converting said plurality of adaptation layer module cell streams to a first multiplexed cell stream;

combining said first multiplexed cell stream with a second cell stream; and converting said combined cell stream to an ATM cell for transmission to a bus.

7. A method of converting asynchronous transfer mode (ATM) data to plesiochronous digital hierarchy (PDH), the method comprising the step of:

receiving an ATM cell from a bus;

converting said ATM cell to a combined cell stream;

segmenting said combined cell stream into a first multiplexed cell stream and a second cell stream;

segmenting said first multiplexed cell stream into a plurality of adaptation layer module cell streams;

converting said adaptation module cell streams into respective sets of second digital signals;

combining said respective sets of said second digital signals into a first digital signal; and receiving and transferring said first digital signal to a network link.

8. A system for cross conversion of asynchronous transfer mode (ATM) data and plesiochronous digital hierarchy (PDH) data, comprising:

in a ATM to PDH conversion, a router for receiving an ATM cell from a bus and converting said ATM cell to a combined cell stream;

a second stage cell multiplexer/demultiplexer for segmenting the combined cell stream into a first multiplexed cell stream and a second multiplexed cell a first stage cell multiplexer/demultiplexer for segmenting said first multiplexed cell stream into a plurality of adaptation layer module cell streams;

a plurality of adaptation layer modules for receiving respective adaptation layer module cell streams and converting said adaptation layer module cell streams into respective sets of second digital signals;

a multiplexer/demultiplexer for receiving and combining said second digital signals into a first digital signal; and a link interface unit for receiving and transferring said first digital signal to a network link.

9. A system as in claim 8, wherein the first digital signal comprises DS3 PDH data.

10. A system as in claim 8, wherein the second digital signals comprise 28 DS1 data.

11. A system as in claim 8, wherein the respective sets of second digital signals comprise a maximum of eight DS1 data signals.

12. A system as in claim 8, wherein the second cell stream consists of operation and management data.

* * * * *